US012587219B2

(12) United States Patent
Yoo et al.

(10) Patent No.: US 12,587,219 B2
(45) Date of Patent: Mar. 24, 2026

(54) ELECTRONIC DEVICE AND METHOD FOR CONTROLLING OUTPUT POWER OF ANTENNA THEREOF

(71) Applicant: Samsung Electronics Co., Ltd., Gyeonggi-do (KR)

(72) Inventors: Jangsun Yoo, Gyeonggi-do (KR); Sunghwan Cho, Gyeonggi-do (KR); Minseok Kim, Gyeonggi-do (KR); Myeonggil Lee, Gyeonggi-do (KR); Gwanghyun Jo, Gyeonggi-do (KR); Gun Lim, Gyeonggi-do (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 470 days.

(21) Appl. No.: 18/195,604

(22) Filed: May 10, 2023

(65) Prior Publication Data

US 2023/0318637 A1 Oct. 5, 2023

Related U.S. Application Data

(63) Continuation of application No. PCT/KR2023/004530, filed on Apr. 4, 2023.

(30) Foreign Application Priority Data

May 24, 2022 (KR) ........................ 10-2022-0063735
Jun. 17, 2022 (KR) ........................ 10-2022-0074413

(51) Int. Cl.
*H04B 1/04* (2006.01)
*H01Q 1/22* (2006.01)
*H04B 1/00* (2006.01)
(52) U.S. Cl.
CPC ......... *H04B 1/0458* (2013.01); *H01Q 1/2291* (2013.01); *H04B 1/0078* (2013.01)

(58) Field of Classification Search
CPC .. H04B 1/0458; H04B 1/0078; H04B 1/3827; H04B 17/102; H01Q 1/2291; H01Q 1/22; (Continued)

(56) References Cited

U.S. PATENT DOCUMENTS 8,989,792 B1* 3/2015 Depew ................. H04B 1/3838
455/575.4
9,042,833 B1* 5/2015 Jayaraj ..................... H04B 1/38
455/66.1
(Continued)

FOREIGN PATENT DOCUMENTS

JP 2018-061155 A 4/2018
KR 10-0600596 B1 7/2006
(Continued)

OTHER PUBLICATIONS

Extended European Search report dated Apr. 29, 2025.
International Search Report dated Jul. 3, 2023.

*Primary Examiner* — Jinsong Hu
*Assistant Examiner* — Rui M Hu
(74) *Attorney, Agent, or Firm* — CANTOR COLBURN LLP

(57) ABSTRACT

An electronic device according to certain embodiments may include a housing, an antenna disposed in the housing or formed in a part of the housing, a grip sensor configured to sense an external object that is in contact or proximity, and a processor operatively connected to the antenna and the grip sensor, wherein the processor may be configured to, when a first sensing value from the grip sensor is less than or equal to a first reference value, determine an output power of the antenna to be a first intensity; when the first sensing value exceeds the first reference value and a second sensing value from the grip sensor received after the first sensing value is between the first reference value and a second reference value higher than the first sensing value, determine (Continued)

whether the electronic device is in a state of use, and when the electronic device is not in the state of use, determine, based on a third reference value and a third sensing value of the grip sensor received after the second sensing value, the output power of the antenna to be the first intensity or a second intensity lower than the first intensity.

16 Claims, 13 Drawing Sheets

(58) Field of Classification Search
CPC ....... H01Q 1/273; G06F 3/041; H04W 52/02; H04W 52/367
See application file for complete search history.

(56) References Cited

U.S. PATENT DOCUMENTS

| | | | | |
|---|---|---|---|---|
| 9,253,733 | B1* | 2/2016 | Lee | H04W 52/283 |
| 9,307,499 | B2* | 4/2016 | Zehr | H04W 52/18 |
| 9,374,655 | B1* | 6/2016 | Lee | H04W 4/80 |
| 9,621,211 | B2* | 4/2017 | Shi | H04B 1/3838 |
| 9,769,769 | B2* | 9/2017 | Harper | H04B 17/13 |
| 9,871,545 | B2* | 1/2018 | Khawand | H04B 1/3838 |
| 11,444,701 | B2 | 9/2022 | Seyed et al. | |
| 11,470,190 | B2 | 10/2022 | Kim | |
| 12,224,786 | B2* | 2/2025 | Wu | H04W 52/367 |
| 2013/0137487 | A1* | 5/2013 | Sato | H04B 1/3838 |
| | | | | 455/566 |
| 2013/0308608 | A1* | 11/2013 | Hu | H04W 72/542 |
| | | | | 370/334 |
| 2015/0199042 | A1* | 7/2015 | Standing | H01Q 1/243 |
| | | | | 345/174 |
| 2016/0061983 | A1* | 3/2016 | Heikura | H01Q 1/243 |
| | | | | 324/207.15 |
| 2016/0095072 | A1* | 3/2016 | Lee | H04W 52/367 |
| | | | | 455/418 |
| 2016/0211876 | A1* | 7/2016 | Yamamoto | H04B 1/3838 |
| 2018/0103436 | A1* | 4/2018 | Hawaka | H04B 17/102 |
| 2019/0036563 | A1* | 1/2019 | Koshy | H04W 52/18 |
| 2019/0141419 | A1* | 5/2019 | Xu | H04W 52/02 |
| 2019/0191393 | A1* | 6/2019 | Kim | H04W 52/346 |
| 2020/0120616 | A1* | 4/2020 | Wu | G06F 1/1618 |
| 2020/0218310 | A1* | 7/2020 | Kim | G06F 1/169 |
| 2021/0051465 | A1* | 2/2021 | Koshy | H04W 52/367 |
| 2021/0105350 | A1* | 4/2021 | Kim | G06F 3/0338 |
| 2021/0306022 | A1 | 9/2021 | Fernando et al. | |
| 2021/0409088 | A1* | 12/2021 | Chang | H04W 52/288 |
| 2022/0039025 | A1* | 2/2022 | Zhang | H04W 52/18 |
| 2022/0093626 | A1 | 3/2022 | Shin et al. | |
| 2022/0261045 | A1* | 8/2022 | Park | H04M 1/0245 |
| 2022/0345167 | A1 | 10/2022 | Yang et al. | |
| 2022/0345168 | A1* | 10/2022 | El Hajj | H04W 52/225 |
| 2023/0132977 | A1* | 5/2023 | Sambhwani | H04W 52/38 |
| | | | | 455/522 |
| 2023/0244294 | A1* | 8/2023 | Chang | G06F 1/3287 |

FOREIGN PATENT DOCUMENTS

| | | |
|---|---|---|
| KR | 10-0670161 B1 | 1/2007 |
| KR | 10-2007-0014384 A | 2/2007 |
| KR | 10-2012-0067095 A | 6/2012 |
| KR | 10-2020-0085546 A | 7/2020 |
| KR | 10-2021-0039731 A | 4/2021 |
| KR | 10-2022-0038218 A | 3/2022 |
| WO | 2022/005031 A1 | 1/2022 |

* cited by examiner

| CONDITION | NORMAL CONDITION (CONDITION OF 0MM SPACING-SAFE SEATING) | | | | | | | CONDITION OF HUMAN BODY | | | Sensing Threshold |
|---|---|---|---|---|---|---|---|---|---|---|---|
| | Air | METALLIC TABLE | RUBBER MAT | GLASS TABLE | ACRYLIC TABLE | WOOD TABLE1 | WOOD TABLE2 | KNEE-7mm | KNEE-0mm | GRIPPING WITH HAND | |
| Difference | 51.3 | 1950.8 | 1697.6 | 1348.1 | 918.3 | 1128.2 | 898.2 | 890.3 | 2906.3 | 31201.5 | 500 |
| RECOGNIZE GRIPPING | X | O | O | O | O | O | O | O | O | O | |
| SAR TEST CONDITION | | | | | | | | O | | | |

FIG. 10

| Band | TRP IN CASE OF USAGE ON TABLE (dBm) | | |
|------|-------------------------|------------------------|----------------------------|
|      | COMPARATIVE TECHNIQUE   | PROPOSED TECHNIQUE     | EFFECT OF PROPOSED TECHNIQUE |
| B1   | 16.4                    | 21.2                   | 4.8                        |
| B3   | 15.58                   | 20.48                  | 4.9                        |
| B7   | 16.56                   | 21.56                  | 5                          |
| B8   | 15.58                   | 20.78                  | 5.2                        |
| B20  | 15.01                   | 20.11                  | 5.1                        |
| B28  | 15.21                   | 19.91                  | 4.7                        |
| B38  | 16.04                   | 21.34                  | 5.3                        |
| B40  | 17.11                   | 22.01                  | 4.9                        |
| n1   | 15                      | 20.1                   | 5.1                        |
| n3   | 14.9                    | 19.9                   | 5                          |
| n8   | 15.65                   | 20.45                  | 4.8                        |
| n20  | 15.73                   | 20.33                  | 4.6                        |
| n28  | 13.88                   | 19.18                  | 5.3                        |
| n38  | 15.11                   | 20.51                  | 5.4                        |
| n78  | 16.01                   | 21.11                  | 5.1                        |

ELECTRONIC DEVICE AND METHOD FOR CONTROLLING OUTPUT POWER OF ANTENNA THEREOF

CLAIM OF PRIORITY

This application is a continuation of International Application No. PCT/KR2023/004530, filed on Apr. 4, 2022, which claims priority to Korean Patent Applications No. KR-10-2022-0063735 filed on May 24, 2022, and KR-10-2022-0074413 filed on Jun. 17, 2022 in the Korean Intellectual Property Office, the disclosures of which are herein incorporated by reference.

BACKGROUND

1. Field

The disclosure relates to an electronic device, for example, to an electronic device capable of transmitting or receiving a wireless signal via at least one antenna and an antenna output power control method of an electronic device.

2. Description of Related Art

An electronic device that a user is capable of carrying such as a laptop personal computer (laptop PC), a tablet PC, or the like may use wireless communication technology to access a network. For example, the electronic device may include wireless communication functions such as wireless LAN (or Wi-Fi), cellular mobile communication (e.g., LTE, 5G), Bluetooth, and the like, and may include at least one antenna used for wireless communication.

Electromagnetic waves output from an antenna of the electronic device may harmful to a human body. For example, low frequency (1 Hz-100 kHz) electromagnetic waves can induce a current in the human body that may stimulate a nerve. High frequency (100 kHz-10 GHz or more) electromagnetic waves can produce heat that can cause burns.

The potential for heat caused by the high frequency may be quantitatively expressed as an electromagnetic wave specific absorption rate (SAR). An electronic device may need to be satisfy an SAR standard. As the amount of output of electromagnetic waves (or Tx power) of an antenna is high, the output power of the antenna may need to be adjusted to satisfy an SAR standard. However, decreasing the output power deteriorates the transmission of a wireless signal. Thus, there is a trade-off between the performance of the wireless communication and the satisfaction of the SAR standard.

To satisfy an SAR standard while maintaining a requisite level of performance of wireless communication, an electronic device configure so that the output power of an antenna is decreased only when a human body is in contact with the electronic device. This is referred to as transmission power backoff (Tx power backoff) control. Moreover, a grip sensor may be used to determine whether a human body is in contact with the electronic device.

The grip sensor may provide a sensing value. The electronic device may use that the sensing value to determine that a human body is in contact. For example, when the sensing value reaches a predetermined reference value, the electronic device may determine that a human body is in contact. Accordingly, the electronic device may perform a transmission power backoff operation.

However, even when the electronic device is in contact with an object different from a human body, the sensing value may have attain the predetermined reference value. Accordingly, although a human body is not actually in contact, the transmission power backoff unnecessarily occurs.

Certain embodiments of the disclosure are to provide an electronic device that may satisfy an SAR standard and while maintaining the performance of wireless communication and an antenna output power control by more accurately determining whether a human body is in contact.

SUMMARY

An electronic device according to certain embodiments may include a housing, an antenna disposed in the housing or formed in a part of the housing, a grip sensor configured to sense an external object that is in contact or proximity, and a processor operatively connected to the antenna and the grip sensor, wherein the processor may be configured to, when a first sensing value from the grip sensor is less than or equal to a first reference value, determine an output power of the antenna to be a first intensity; when a second sensing value from the grip sensor received after the first sensing value is between the first reference value and a second reference value higher than the first sensing value, determine whether the electronic device is in a state of use, and when the electronic device is not in the state of use, determine, based on a third reference value and a third sensing value of the grip sensor received after the second sensing value, the output power of the antenna to be the first intensity or a second intensity lower than the first intensity.

A method of controlling the output power of an antenna of an electronic device according to certain embodiments may include when a first sensing value from a grip sensor is less than or equal to a first reference value, determine an output power of the antenna of the electronic device to be a first intensity; when a second sensing value from the grip sensor received after the first sensing value is between the first reference value and a second reference value higher than the first sensing value, determine whether the electronic device is in a state of use; and when the electronic device is not in a state of use, determine, based on a third reference value and a third sensing value of the grip sensor received after the second sensing value, the output power of the antenna to be the first intensity or a second intensity that is lower than the first intensity.

BRIEF DESCRIPTION OF THE DRAWINGS

FIG. 1 is a block diagram of an electronic device in a network environment according to certain embodiments.

FIGS. 2A, 2B, 2C, and 2D are diagrams illustrating the structure of an electronic device according to certain embodiments.

FIG. 6 is a table listing a Cap difference value measured for each object by an electronic device according to certain embodiments.

FIG. 10 is a table listing an average output power measured for each frequency band by an electronic device according to certain embodiments.

DETAILED DESCRIPTION

Figure 2A:
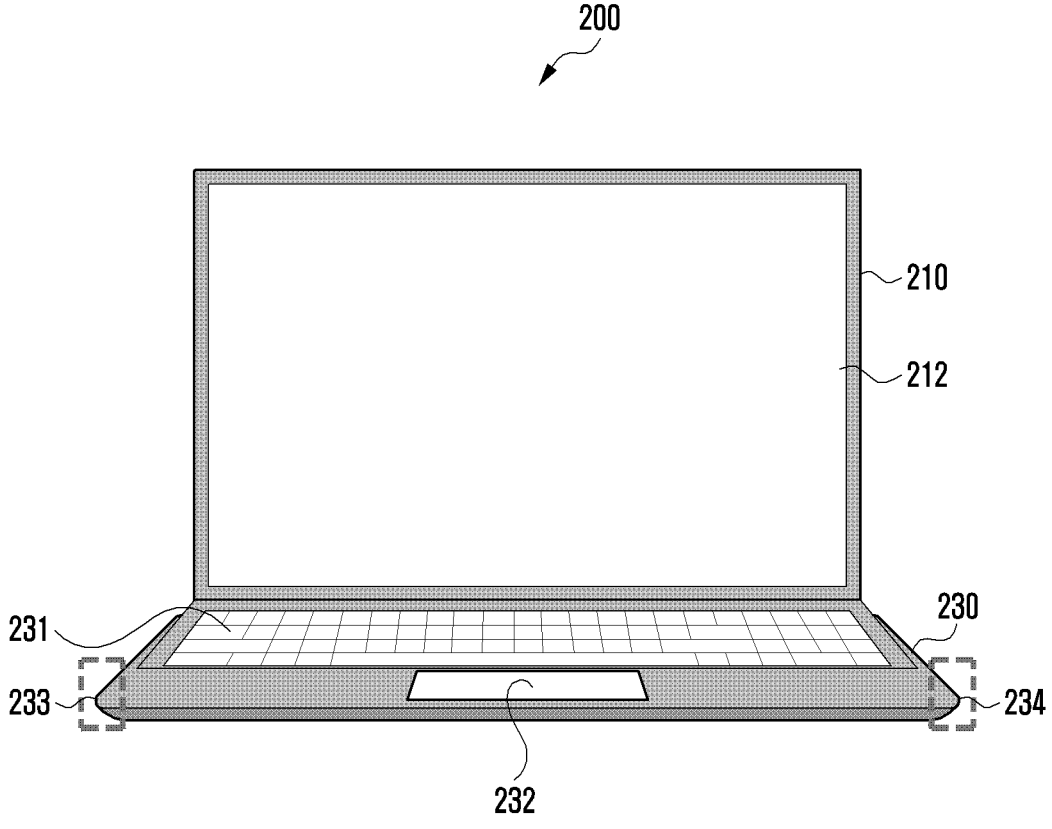

According to certain embodiments, an electronic device and an antenna output power control method of an electronic device may determine whether to perform an antenna output power backoff operation based on a sensing value of a grip sensor and a use state of an electronic device of a user, so as to satisfy an SAR standard and optimize the performance of wireless communication.

Figure 1:
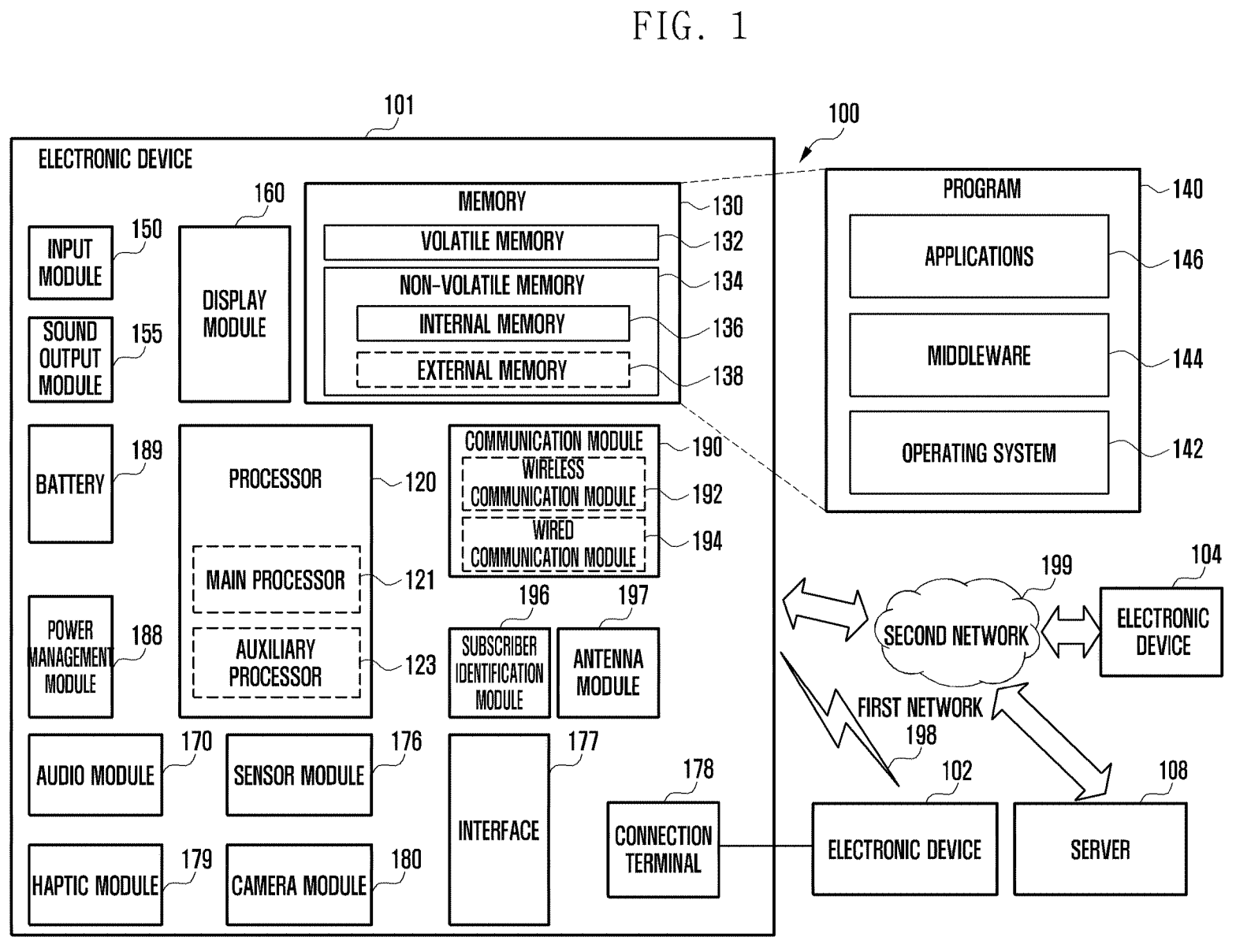

FIG. 1 describes an exemplary electronic device 100. The electronic device 100 can provide a number of different functions. Additionally, the electronic device 100 may include an antenna module 197. The antenna module 197 may communicate with a network by using electromagnetic signals. The electromagnetic signals can cause burns to the human body, depending on the intensity of transmission.

Accordingly, it is important to limit the SAR. However, limiting the SAR may result in degradation of the communication between the electronic device 100 and the network. Accordingly, reducing the intensity of the electromagnetic signals (a backoff operation) when a human body is in contact with the electronic device.

A grip sensor can indicate when the body is in contact with the electronic device. However, other objects (besides the human body) may also cause the grip sensor output. Accordingly, certain embodiments may perform a backoff operation based on the output of a grip sensor as well as a determination of whether the electronic device 100 is in use.
Electronic Device FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

As used in this document, the term "processor" shall be understood to refer to both the singular and plural contexts.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to certain embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with certain embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Housing

An electronic device 200 can be disposed in a housing. Moreover, the antenna 233, 234 can be disposed proximate to the housing to better propagate electromagnetic signals. However, if the user's body is proximate to the antenna, the electromagnetic signals with high enough intensity may cause burns to the user.

FIGS. 2A, 2B, 2C, and 2D are diagrams illustrating the structure of an electronic device according to certain embodiments.

Figure 2B:
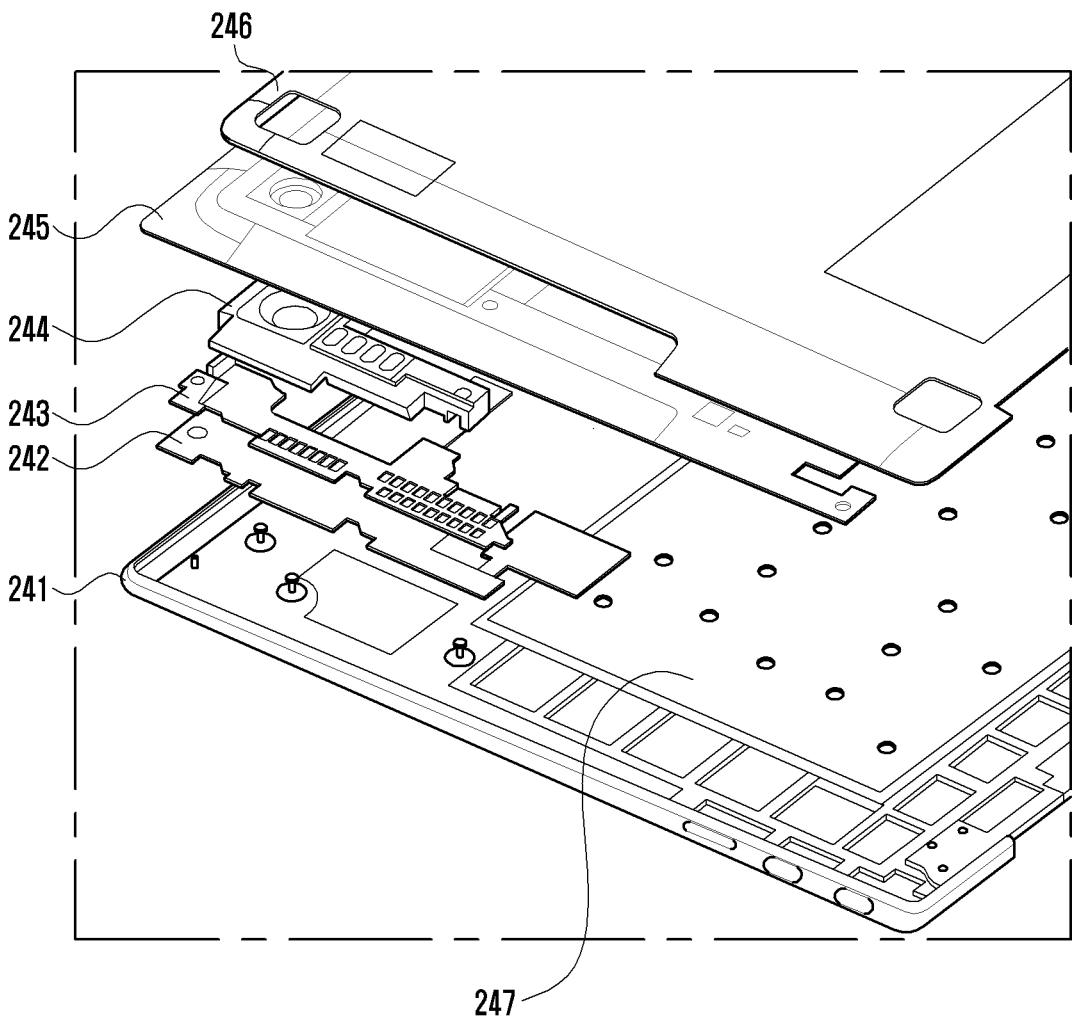
Figure 2C:
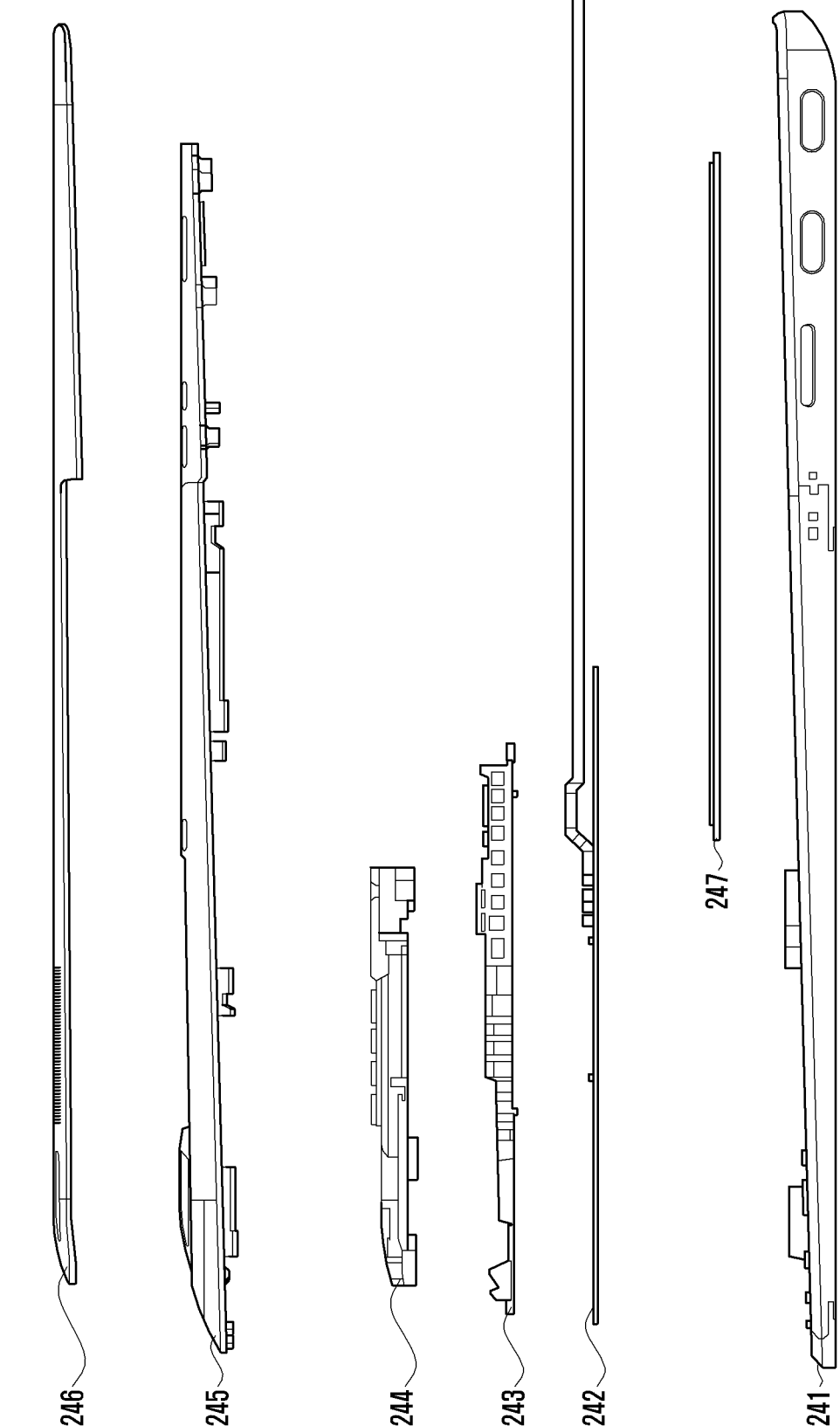

FIGS. 2A, 2B, and 2C describe the structures of a laptop personal computer (laptop PC) which is an example of an electronic device.

Referring to FIG. 2A, an electronic device 200 may include a display housing 210 (or a first housing) and a main body housing 230 (or a second housing). The display housing 210 may include a display 212 and may be rotatably coupled with the main body housing 230 in a direction in which the display 212 is exposed to the outside in an open state and is hidden inside in a closed state.

Inside the main body housing 230, various components such as a processor, a memory, a radio frequency front end (RFFE) module, and a battery may be disposed, and at least part of the components may be mounted on a printed circuit board (PCB) and may be electrically connected to each other. Among the components included in the main body housing 230, a keyboard 231 and a touch pad 232 may be exposed to the upper end of the main body housing 230 in order to receive a user input.

According to certain embodiments, the electronic device 200 may include various types of wireless communication functions such as wireless LAN (or Wi-Fi), cellular mobile communication (e.g., LTE, 5G), Bluetooth, and the like, and may include at least one antenna 233 and 234 for the wireless communication function. The electronic device 200 may include an antenna used for each communication scheme, and at least some of the antennas may transmit or receive signals of various communication schemes.

According to certain embodiments, the at least one antenna 233 and 234 may be disposed in a lateral side of the main body housing 230. For example, in the main body housing 230 of the electronic device 200, palm rest parts which are both spaces beside the touch pad 232 may allow disposition in a large area, and thus may be the most effective spaces for the antennas 233 and 234 to be disposed. The antenna 233 and 234 may be disposed inside the main body housing 230 or may be formed in a lateral side and/or at least a part of the bottom side, and may transmit or receive a wireless signal. For example, the area of the main body housing 230 where the antenna 233 and 234 is disposed may be made of a nonmetallic material.

FIG. 2B and FIG. 2C are exploded perspective views of the main body housing 230 of the electronic device 200 in the upside-down state. As illustrated in the drawing, from the top to the bottom of the main body housing 230 (from the bottom to the top in FIG. 2B and FIG. 2C), a mutually coupled C plastic cover and C metal cover 241, a keyboard bracket 247, an antenna FPCB 242, an antenna reception part 243 (ANT carrier), a speaker module 244, a D plastic cover 245, and a D metal cover 246 are layered and coupled with each other.

The antenna 233 and 234 may be disposed inside the main body housing 230 and may be accommodated by the antenna reception part. The antenna reception part may be formed of a nonmetallic material to enable electromagnetic waves of the antenna 233 and 234 to pass. According to an embodiment, at least a part of the antenna 233 and 234 may be exposed to the outside of the main body housing 230 in order to emit electromagnetic waves. The antenna 233 and 234 may be electrically connected to an antenna FPCB.

According to SAR regulation, in case that the antenna 233 and 234 is disposed within a predetermined distance (e.g., 150 mm) from the bottom of the electronic device 200, the case may need to go through a test. The electronic device 200 may be configured to be thin for portability, and the antenna 233 and 234 may be disposed within a distance based on the SAR regulation from the bottom side. Therefore, the electronic device 200 may need to be designed to satisfy an SAR standard. For example, the electronic device 200 may use a grip sensor to sense whether a human body is in contact or proximity, and may perform a backoff operation that decreases the output power of the antenna 233 and 234 when a human body is in contact with or in proximity to the antenna 233 and 234. However, in case that the electronic device 200 decreases the output power of the antenna 233 and 234 in order to satisfy the SAR standard, the performance of transmission of a wireless signal may deteriorate, and thus the performance of the wireless communication and the satisfaction of the SAR standard may be in a tradeoff relationship (or trade-off).

According to certain embodiments, based on a plurality of reference values based on sensing values measured in various scenarios and a use state of the electronic device 200, the electronic device 200 may identify whether a human body is in contact or proximity according to the SAR standard, and may perform a backoff operation with respect to the antenna 233 and 234 only in case that a human body is actually in contact or proximity.

Figure 2D:
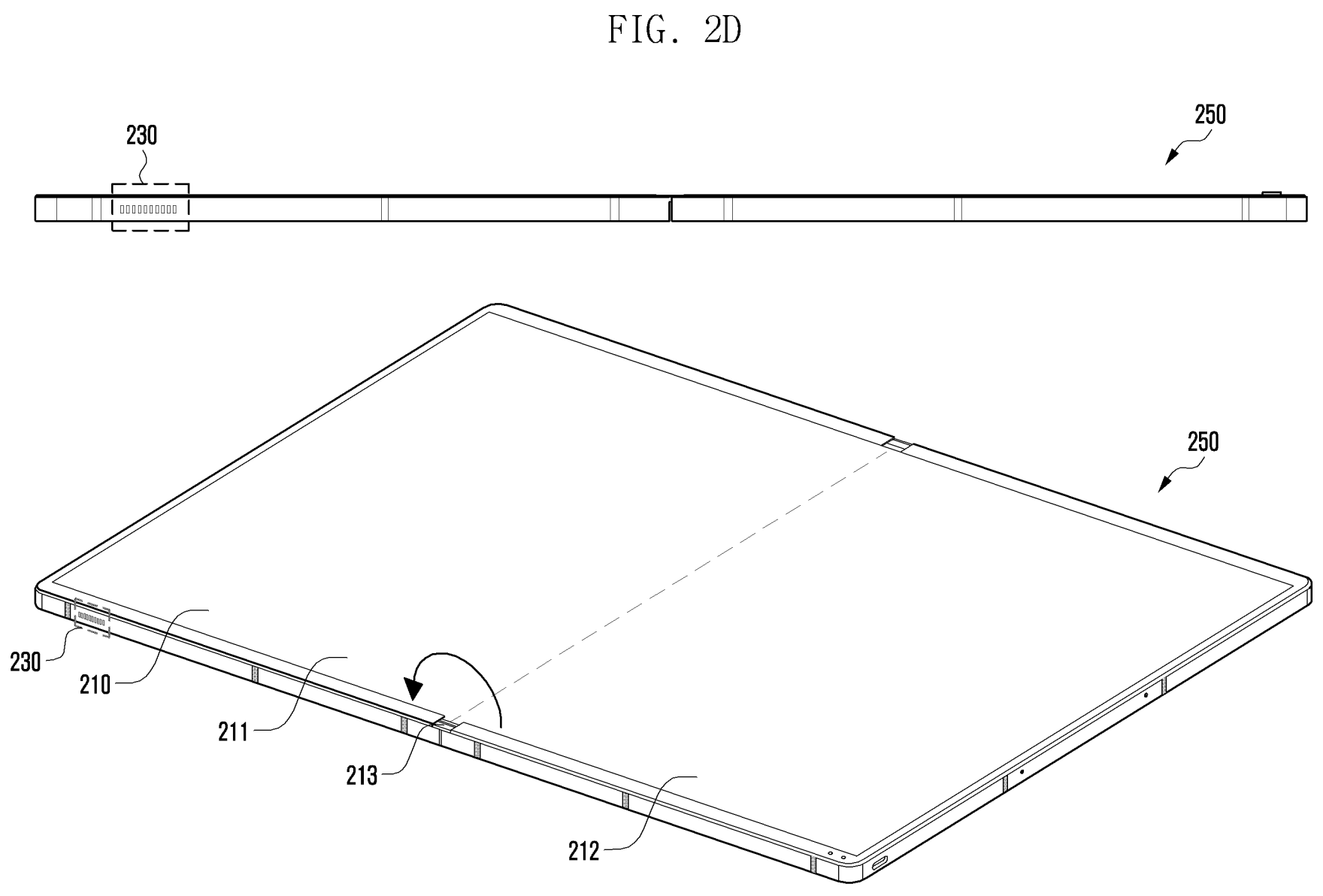

FIG. 2D illustrates the structure of a tablet PC that is an example of an electronic device.

Referring to FIG. 2D, an electronic device 250 may include a display 210 exposed through the front side of the housing. According to certain embodiments, at least a part of the display 210 may be flexible, bendable, or foldable. For example, FIG. 2D illustrates the display 210 in an unfolded state, and the display 210 may be divided as a first area 211 and a second area 212 based on a central line 213, and may be foldable based on the central line 213. In case that the electronic device 250 is completely folded, the display 210 may be hidden inside. The electronic device 250 may include a first housing that covers the first area 211 of the display 210 and a second housing that covers the second area 212 of the display 210, and the first housing and the second housing may be rotatably coupled. The display 210 may be a touch screen that may sense a user touch input.

The electronic device 250 may be fixed in the state of being at least partially folded. For example, the second housing is tilted at predetermined degrees in the state in which the first housing is placed in the floor, and thus the electronic device 250 may be used in the form of a laptop PC. In this instance, an application screen is displayed in the second area 212 of the display 210, and a keyboard screen may be displayed in the first area 211 to receive a user input.

According to certain embodiments, an antenna 230 may be disposed in a lateral side of the first housing or the second housing. For example, the area of the first housing or the second housing in which the antenna 230 is disposed may be made of a nonmetallic material to enable the electromagnetic waves of the antenna 230 to be emitted. According to another embodiment, at least a part of the antenna 230 may be exposed to the outside of the housing. Although the structures of a laptop PC (FIGS. 2A, 2B, and 2C) and a foldable tablet PC (FIG. 2D) have been described as examples of an electronic device in the above description, an electronic device according to certain embodiments of the disclosure is not limited thereto. For example, an electronic device that includes an antenna having various types of wireless communication functions such as wireless LAN (or Wi-Fi), cellular mobile communication (e.g., LTE, 5G), Bluetooth, and the like, may be the electronic device of the disclosure.

Generally speaking, when the user's body is not touching the electronic device, the antenna 230. 233, 234, the antenna may transmit the electromagnetic waves with a higher intensity. However, when a user's body is touching the electronic device 200, the electronic device can perform a backoff operation. A grip sensor can be indicative of whether a user's body is proximate to the electronic device 200.

Figure 3:
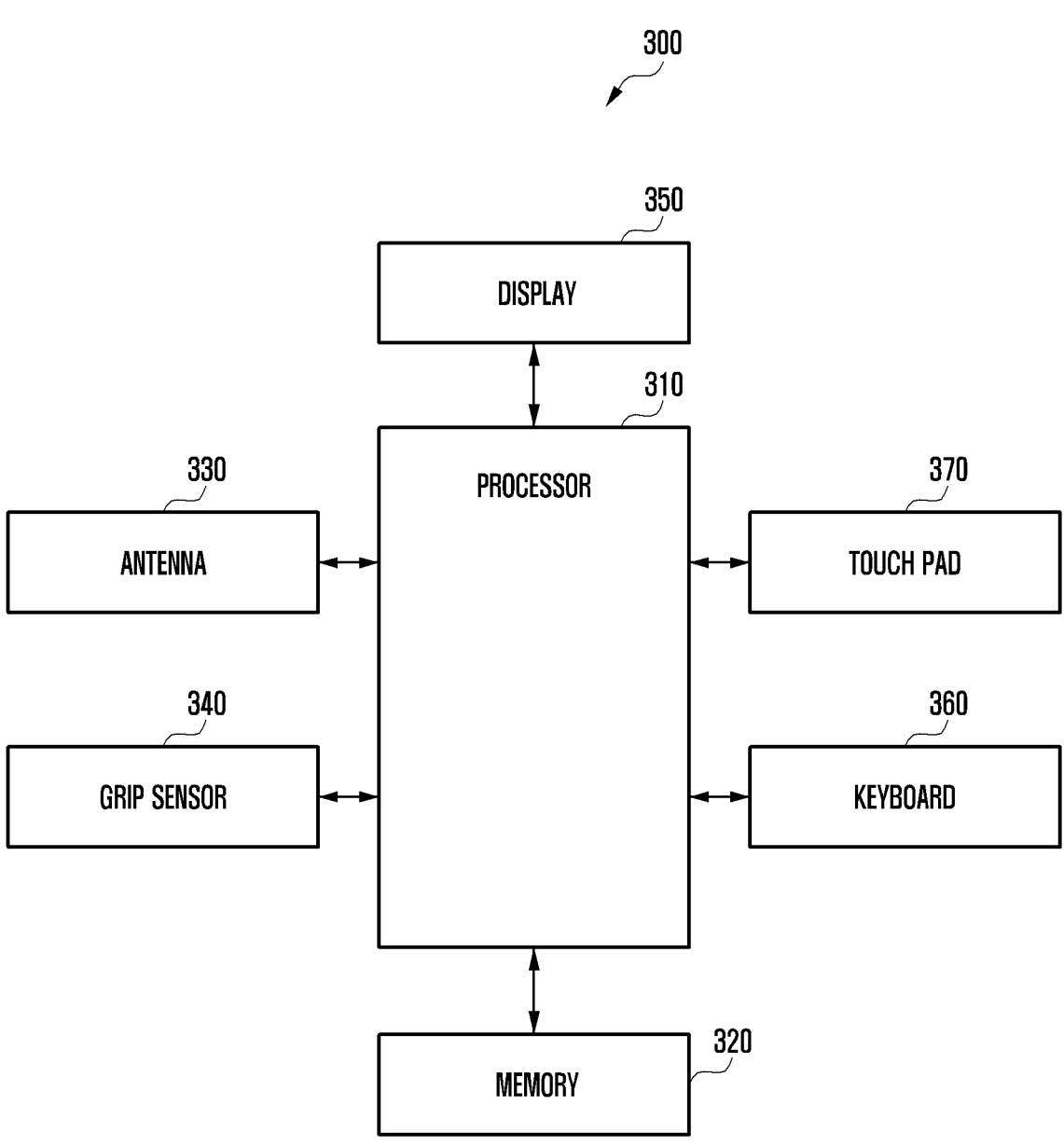
FIG. 3 is a block diagram of an electronic device according to certain embodiments.

FIG. 3 is a block diagram of an electronic device according to certain embodiments.

Referring to FIG. 3, an electronic device 300 according to certain embodiments may include a processor 310, a memory 320, an antenna 330, a grip sensor 340, a display 350, a keyboard 360, and a touch pad 370. Although part of the illustrated components may be omitted or replaced, the certain embodiments of the disclosure may be embodied. The electronic device 300 may further include at least a part of the components and/or functions of the electronic device 101 of FIG. 1, and may include the structure of the electronic device 200 of FIGS. 2A to 2C or the structure of the electronic device 250 of FIG. 2D.

The electronic device 300 according to certain embodiments may be a laptop personal computer (laptop PC), and is not limited thereto. For example, the electronic device 300 is a device, such as a tablet PC, a smartphone, or the like, which includes an antenna having various types of wireless communication functions such as wireless LAN (or Wi-Fi), cellular mobile communication (e.g., LTE, 5G), Bluetooth, and the like, and may be a device that needs to satisfy a specific absorption rate (SAR) standard.

According to certain embodiments, the display 350 may display an image provided from the processor 310. For example, although the display 350 may be embodied as any one of a liquid crystal display (LCD), a light-emitting diode (LED) display, an organic light-emitting diode (OLED) display, a microelectromechanical systems (MEMS) display, or an electronic paper display, it is not limited thereto. The display 350 may include at least part of the configuration and/or functions of the display module 160 of FIG. 1.

According to certain embodiments, the keyboard 360 may include various keys, and the plurality of keys may be disposed in the form of, for example, a QWERTY key arrangement. Based on a user input to each key, the keyboard 360 may transfer key input information to the processor 310.

According to certain embodiments, the touch pad 370 may detect a user touch input. For example, the touch pad 370 which is a capacitive touch pad may sense the location of a user touch based on a change in capacitance and may transfer the same to the processor 310 as an input signal. The touch pad 370 may include a wheel area and may include at least one hard key corresponding to a mouse input key.

The electronic device 300 may include a display housing (or a first housing) and a main body housing (or a second housing). The display housing (e.g., the display housing 210 of FIG. 2A) may include the display 350, and may be rotatably coupled with the main body housing (e.g., the main body housing 230 of FIG. 2A) in a direction in which the display 350 is hidden inside. Inside the main body housing, various components such as the processor 310, the memory 320, a radio frequency front end (RFFE) module, and a battery may be disposed, and at least part of the components may be mounted on a printed circuit board (PCB) and may be electrically connected to each other. The keyboard 360 and the touch pad 370 may be exposed to the upper end of the main body housing so as to receive a user input.

According to certain embodiments, the electronic device 300 may include at least one antenna 330. The antenna 330 may change an electric signal into electromagnetic waves and may emit the same (Tx), or may change electromagnetic waves into an electric signal (Rx). According to an embodiment, the electronic device 300 may include four antennas 330 for supporting 5G mobile communication. In case that the electronic device 300 includes a plurality of antennas, each antenna may be disposed to be spaced apart from one another, and may be disposed in, for example, a palm rest area corresponding to a lateral side of the touch pad 370 of the main body housing. The antenna 330 may include at least part of the configuration and/or functions of the antenna module 197 of FIG. 1.

According to certain embodiments, the grip sensor 340 may sense whether a human body is in contact or proximity. For example, based on a change in capacitance sensed via a recognition pad, the grip sensor 340 may sense whether a human body is in contact or proximity. The recognition pad may be connected to a ground of a PCB and, in case that a human body or an external object is in contact with the recognition pad, a change in capacitance may occur due to contact.

According to certain embodiments, the grip sensor 340 may include an integrated structure connected to at least a part of the one or more antennas 330. For example, a pattern of the antenna 330 may be designed to operate as a recognition pad of the grip sensor 340, and, when the body of a user is in contact with or proximity to the antenna 330, the grip sensor 340 may sense the contact or proximity. According to an embodiment, at least a part of the antenna pattern may be connected to the grip sensor 340 and a communication module (or an RFFE module), an RF chocking inductor that acts as a low pass filter (LPF) may be disposed in a path to the grip sensor 340 and a DC blocking capacitor that acts as a high pass filter (HPF) may be disposed in a path to a communication module. Accordingly, a high frequency signal of the antenna 330 may not be input to the grip sensor 340, and the antenna 330 may act as an emitter for wireless communication and may also act as a recognition pad for grip sensing. According to an embodiment, the grip sensor 340 may supply a signal of a frequency lower than a frequency of a wireless signal output from the antenna 330 and may detect a change in permittivity caused thereby, and may sense a human body being in contact.

According to certain embodiments, the memory 320 may include a volatile memory and/or a non-volatile memory which are publicly known. The memory 320 may store various instructions that may be performed in the processor 310. The instructions may include control commands, such as arithmetic and logic operation, data transfer, input and output, and the like, which may be recognized by the processor 310. The memory 320 may include at least part of the configuration and/or functions of the memory 130 of FIG. 1, and may store at least part of the program 140 of FIG. 1.

According to certain embodiments, the processor 310 may be a component capable of performing an operation and data processing associated with controlling and/or communication of each component of the electronic device 300, and may include at least a part of the configuration of the processor 120 of FIG. 1. The processor 310 may be operatively, electrically, and/or functionally connected to the internal components of the electronic device 300 such as the display 350, the keyboard 360, the touch pad 370, the antenna 330, the grip sensor 340, the memory 320, and the like.

According to certain embodiments, when a first sensing value from the grip sensor is below (or equal) a first reference value, the processor 310 determines that the electronic device 300 is not touching or in proximity to the user's body. Accordingly, the processor 310 determines the output power of the antenna 330 to be a first intensity. The first reference value can be a value that is lower (or a threshold lower) than sensing values measured in a state (or observed empirically) when the electronic device 300 separated (or known to be separated) from a human body by a predetermined distance.

When the first sensing value exceeds the first reference value, and a second sensing value from the grip sensor 340 exceeds a second reference value, the processor 310 may determine that the electronic device 300 is in contact with the human body. Accordingly, the processor 310 determines the output power of the antenna 330 to be a second intensity that is lower than the first power. The second reference value can be a value that is lower (or a threshold lower) than sensing values measured in a state when the electronic device 300 is in contact with the human body.

When the second sensing value is between the first reference value and the second reference value, the processor determines whether the electronic device 300 is in a state of use. When the electronic device 300 is in a state of use, the power output from the antenna is maintained at the first power. When the electronic device 300 is not in a state of use, the output power of the amplifier is based on a third sensing value and a third reference value.

According to certain embodiments, although the operations and data processing functions that the processor 310 is capable of implementing in the electronic device 300 are not limited, the disclosure will describe certain embodiments that determine, based on a sensing value of the grip sensor 340, whether a human body is in contact, and control a backoff function with respect to the antenna 330. Operations of the processor 310 to be described below may be performed by implementing instructions stored in the memory 320.

According to certain embodiments, the electronic device 300 may perform a backoff operation. The backoff operation decreases the output power of the antenna 330 according to the SAR standard. The thermal action caused by the high frequency output from the antenna 330 may be quantitatively expressed as an electromagnetic wave specific absorption rate (SAR). The electronic device 300 may need to be designed to satisfy the SAR standard. Regarding the SAR, when the amount of output of electromagnetic waves (or Tx power) of the antenna 330 is high, the degree of harmfulness affecting a human body is increased. Thus the electronic device 300 may perform a backoff operation when the antenna 330 is in contact with a human body.

The electronic device 300 can determine whether to perform an output power backoff operation with respect to the antenna 330. The power backoff operation can be based on comparison between a sensing value of the grip sensor 340 and various reference values, and a use state of the electronic device 300. The backoff operation is performed in the foregoing manner to satisfy the SAR standard and optimize the wireless communication.

The sensing value of the grip sensor 340 described below may be digital data that corresponds to (or is proportional to) the difference between a capacitance value measured by the electronic device 300 in the state in which an adjacent object is not present and the currently measured capacitance value.

The processor 310 may control the antenna 330 to have the maximum output (e.g., a first intensity) when a human body is not sensed to be in contact or proximity. In this instance, the grip sensor 340 may periodically sense whether a human body or an external object is in contact or proximity.

The processor 310 may identify a first sensing value of the grip sensor 340. The first sensing value may be a sensing value of the grip sensor 340 measured in the state in which a backoff operation with respect to the antenna 330 is not triggered.

According to certain embodiments, the processor 310 may maintain (or determine) the first intensity (e.g., the maximum output) as the output power of the antenna 330 when the first sensing value is less than or equal to a first reference value.

Determining the first intensity (e.g., the maximum output) as the output power of the antenna 330 may include maintaining the first intensity (e.g., the maximum output) as the output power of the antenna 330 or changing the output power of the antenna 330 to the first intensity (e.g., the maximum output). Here, the first reference value may be determined according to the SAR standard, and may be a value lower than a sensing value measured in the state in which the antenna 330 is spaced a predetermined distance from the human body. In addition, the first reference value may be a value lower than a sensing value sensed in the state in which an object (e.g., a table) different from a human body is in contact with the antenna 330. Examples associated with a sensing value measured in the state in which a human body is in contact with or in proximity to the antenna 330 and a sensing value measured in the state in which an external object, different from a human body, is known to be in contact with the antenna 330. The foregoing will be described with reference to FIG. 6.

In certain embodiments, the first reference value may be lower each of the foregoing values by a threshold, e.g., a threshold lower than a sensing value sensed when the antenna is a predetermined distance from the human body, a threshold lower than a sensing value sensed when an object (e.g., a table) different from a human body is in contact with the antenna 330, and a threshold lower than a sensing value sensed when a human body known to be in contact with or in proximity to the antenna.

According to certain embodiments, the processor 310 may identify a sensing value of the grip sensor 340 continuously after sensing the first sensing value. When a second sensing value subsequently measured increases to higher than the first reference value, the processor 310 may compare the second sensing value with a second reference value. Here, the second reference value may be greater than the first reference value. The second reference value may be lower than a value sensed when a human body is in contact with the antenna 330.

According to certain embodiments, according to the SAR regulation, the grip sensor 340 of the electronic device 300 may recognize a human body even when being close to a human body before being in contact. Accordingly, a sensing parameter value of the grip sensor 340 may be configured.

In this instance, a change in a sensing value may occur even when the antenna 330 is in contact with an external object (e.g., a table) that has a lower permittivity than that of a human body. For example, when the electronic device 300 is placed on a table, the antenna 330 and the table may be in contact. In this instance, a sensing value sensed by the grip sensor 340 may be lower than when a human body is in contact, but may be in a similar level as when a human body approaches within a predetermined distance from the antenna 330. Accordingly, a range between the first reference value and the second reference value may be set a range that is observed in which both a human body or an external object may be sensed, and hereinafter, the range may be defined as a human body-object mixed sensing range.

In case that a sensing value of the grip sensor 340 falls within the human body-object mixed sensing range, the electronic device 300 may identify whether a human body is in contact with or in proximity to the antenna 330 or whether an external object (e.g., a table) different from a human body is in contact with or in proximity to the antenna 330 according to the following method.

According to certain embodiments, in case that the second sensing value is between the first reference value and the second reference value, the processor 310 may identify whether the electronic device 300 is in state of use or not in a state of use. For example, the state of use may be the state in which a user is using the electronic device 300 via an input device, and state of not in use (not in a state of use) may be the state in which a user input separately provided, such as watching a content via the display 350, is not present.

According to certain embodiments, in case that a user input is provided to at least one of the keyboard 360 or the touch pad 370, the electronic device 300 may determine that the electronic device 300 is in the state of use. For example, in case that a user input is provided via the keyboard 360 and/or the touch pad 370 after an operation of sensing a human body is triggered since a sensing value of the grip sensor 340 exceeds the first reference value, the electronic device 300 may be determined as being in the state of use.

According to certain embodiments, the processor 310 may maintain the first intensity (e.g., the maximum output) as the output power of the antenna 330 in case that the electronic device 300 is in the state of use. The state of use is the state in which a user provides input to the keyboard 360 or the touch pad 370 with a hand, and thus it is identified as a situation in which the electronic device 300 is used, being placed on an external object such as a table, from the perspective of a usage scenario. In this instance, the body of a user is not close to the antenna 330 and an increase in the sensing value of the grip sensor 340 is due to an external object being in contact, and thus it is determined that the electromagnetic waves from the antenna 330 may not affect the human body. In this instance, although a sensing value of a grip sensor falls within the human body-object mixed sense area, it is determined that the antenna 330 is not in contact with or not in proximity to a human body, and thus a backoff operation with respect to the antenna 330 may not be performed. Moreover, in a state of use, it may also be more important to preserve the quality of the wireless communication to maintain the user experience.

According to certain embodiments, based on a third reference value and a third sensing value of the grip sensor 340 identified after identification of the second sensing value, the processor 310 may determine whether to maintain the first intensity as the output power of the antenna 330 or to change to a second intensity lower than the first intensity, in case that the electronic device 300 is not in a state of use. Here, to decrease the output power of the antenna 330 to the second intensity may be a backoff operation with respect to the antenna 330.

According to certain embodiments, the electronic device 300 may adjust gain of a power amplifier (PAM) of an RF front end module connected to the antenna 330, and may adjust the output power of the antenna 330 to the first intensity or the second intensity. According to another embodiment, the electronic device 300 may control at least a part of the RF front end module or the antenna 330 to operate based on a fixed value stored in a non-volatile (NV) area.

According to certain embodiments, the processor 310 may be configured to compare the difference between the third sensing value and the first sensing value with the third reference value. In case that the first sensing value is increased higher than the first reference value, the processor 310 may record the same. After a predetermined n seconds elapses, the third sensing value may be identified from the records. The processor 310 may calculate the difference between the third sensing value ($S_n$) and the recorded first sensing value ($S_0$), and may identify whether the calculated difference is greater than the third reference value. The third reference value may be a value greater than the first reference value and less than the second reference value.

According to certain embodiments, in case that the difference between the third sensing value ($S_n$) and the recorded first sensing value ($S_0$) is greater than the third reference value, the processor 310 may determine that a human body is in contact with or in proximity to the antenna 330. Conversely, in case that in the difference between the third sensing value ($S_n$) and the recorded first sensing value ($S_0$) is less than or equal to the third reference value, the processor 310 may determine that an object different from a human body is in contact, and may decrease the output intensity of the antenna 330 to the second intensity.

As described above, the electronic device 300 may compare the third reference value with the difference between the third sensing value ($S_n$) and the recorded first sensing value ($S_0$), and may determine whether an object that is in contact with or in proximity to the antenna 330 is a human body or an object, different from a human body, even in the unused state in which a user input to an input device is not present.

Figure 4:
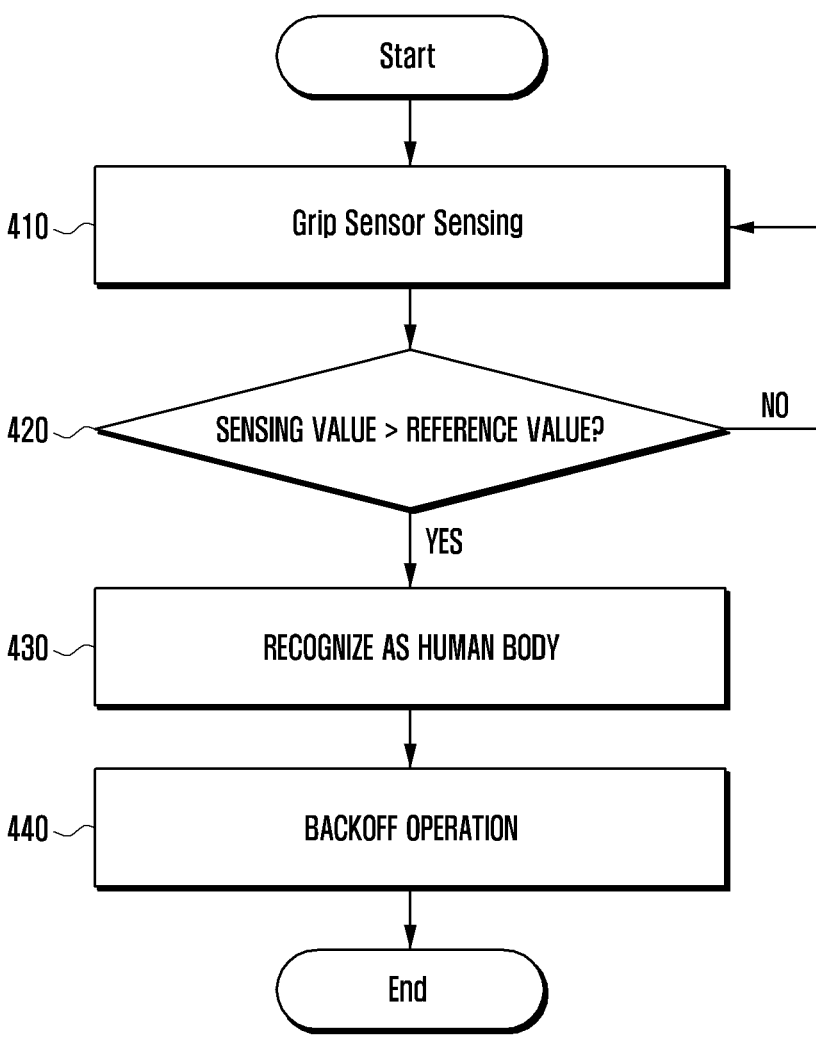
FIG. 4 is a flowchart illustrating an antenna output control method of an electronic device according to a comparative example.

FIG. 4 is a flowchart illustrating an antenna output control method of an electronic device according to a comparative example.

The illustrated method may be a comparative example for certain embodiments to be described with reference to FIG. 3 and FIGS. 5 to 10, but is not the conventional art.

In FIG. 4, when the sensing value from the threshold sensor exceeds a reference value at 420, the processor 310 determines that the electronic device is in contact with the human body at 430, and performs a back operation 440. If the reference value at 420 is the first reference value, the power may be reduced unnecessarily. On the other hand, if the reference value at 420 is the second reference value, the power might not be reduced when the device is in fact, in contact with the human body.

Referring to FIG. 4, in operation 410, an electronic device (e.g., the processor 310 of FIG. 3) may identify a sensing value of a grip sensor (e.g., the grip sensor 340 of FIG. 3). According to an embodiment, the grip sensor may sense a capacitance value (or a change in a capacitance value) in real time or periodically, or may sense a capacitance value when a wireless signal is output via an antenna (e.g., the antenna 330 of FIG. 3). The sensing value of the grip sensor described below may be digital data that corresponds to (or is proportional to) the difference between a capacitance value measured by the electronic device in the state in which an adjacent object is not present and the currently measured capacitance value.

In operation 420, the electronic device may identify whether the identified sensing value of the grip sensor is increased higher than a configured reference value (threshold). Here, the reference value is a value determined based on an SAR standard, and may correspond to a sensing value (or a change in a sensing value) sensed in the state in which the electronic device is spaced a predetermined distance (e.g., 7 mm) apart from a human body, or may be a value lower than that. The reference value may be determined to be different for each model of the electronic device, and may be determined according to an SAR experiment result in each manufacturing process associated with an electronic device.

In case that the identified sensing value of the grip sensor is less than or equal to the reference value, the electronic device may determine the output power of the antenna to be a first intensity (e.g., the maximum output).

In case that the identified sensing value of the grip sensor is greater than the reference value, the electronic device may determine that an object that is in contact or proximity is a human body in operation 430.

In operation 440, in case that a human body is in contact or proximity, the electronic device may perform a backoff operation with respect to the antenna. For example, the electronic device may determine that the output power of the antenna to be a second intensity that is lower than the first intensity. To this end, the electronic device may adjust gain of a power amplifier (PAM) of an RF front end module connected to the antenna, or may control at least a part of the RF front end module or the antenna so as to operate based on a fixed value stored in a non-volatile (NV) area.

The comparative example described in FIG. 4 compares a sensing value of a grip sensor with a single reference value and determines whether a human body is in contact (or proximity). In this instance, in case that the sensing value falls within a human body-object mixed sensing range, whether an object that is in contact (or proximity) is a human body or an external object different from a human body is not identified. Accordingly, even though a human body is not actually in contact with the antenna, backoff is performed, and thus performance limitation may happen such that high-performance wireless communication is not enabled.

Figure 5:
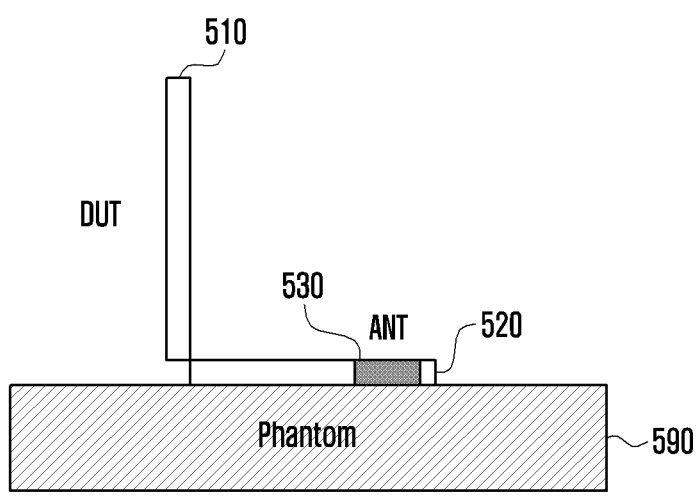
FIG. 5 is a diagram illustrating an example of an SAR test method of an electronic device.
Figure 5:
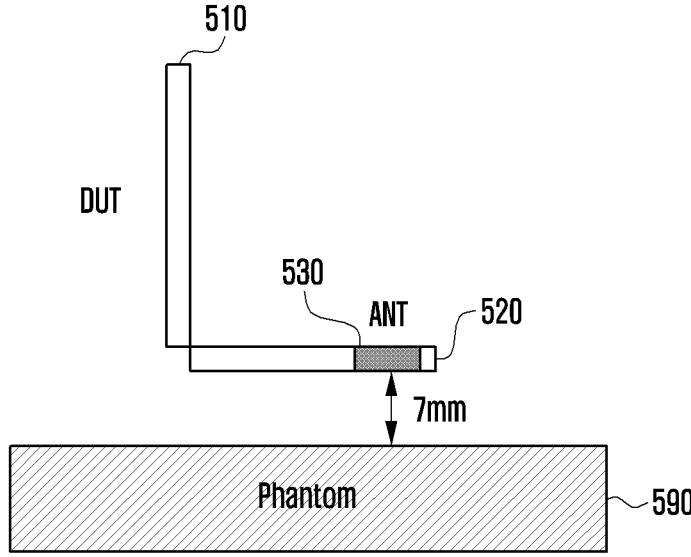

FIG. 5 is a diagram illustrating an example of an SAR test method of an electronic device.

According to certain embodiments, the electronic device 500 (e.g., the electronic device 300 of FIG. 3) may dispose at least one antenna 530 (e.g., the antenna 330 of FIG. 3) in a lateral side of the main body housing 520. For example, the antenna 530 (e.g., the antenna 233 and 234 of FIG. 2A) may be disposed in each of the palm rest areas that are spaces beside a touch pad (e.g., the touch pad 232 of FIG. 2A) in the main body housing 520 (e.g., the main body housing 230 of FIG. 2A).

The electronic device 500 (e.g., a laptop PC) may be used generally in the state in which the bottom side of the main body housing 520 is in contact with any one place, as opposed to being used in the state of floating in the air. On the assumption of such a usage scenario, the SAR test on the electronic device 500 may be performed with respect to the electromagnetic waves of the bottom side of the main body housing 520 from the perspective of usability.

The electromagnetic waves output from the antenna 530 may affect a human body when the human body approaches within a predetermined distance from the antenna 530 as well as when the human body is completely in contact therewith. Accordingly, the SAR test regulation may require a grip sensor to recognize a human body from the point in time at which a human body approaches and starts being within a predetermined distance in which the human body may be affected. According to the regulation, a sensing parameter value of the grip sensor may be configured under a condition of spacing of a predetermined distance, as opposed to a condition of contact (or 0 mm).

Referring to FIG. 5, the SAR test may be performed on the electronic device 500 under each of a human body contact condition and a human body proximity condition. A phantom 590 used when the SAR test is performed may be an object that has an appearance in a size similar to that of the structure of a human anatomy, and has the relative permittivity ($\varepsilon$), conductivity ($\sigma$), and/or density ($\rho$) of a human anatomy.

The human body contact condition is an experimentation performed by assuming that the antenna 530 disposed in a lateral side of the electronic device 500 is in contact with a human body, a grip sensor may determine whether a human body is in contact. In this instance, the antenna 530 and the phantom 590 may be disposed in the state of being in contact with each other (or spaced a distance of 0 mm apart), and the antenna 530 may output a signal at a backoff output power (or a second intensity) as opposed to the maximum output (or a first intensity). In this condition, the backoff output power of the electronic device 500 may be determined according to the SAR standard such that the amount of electromagnetic waves absorbed by a human body is greater than or equal to a predetermined level. The backoff output power may differ for each product according to an experimentation result.

The human proximity condition is an experimentation performed by assuming that the antenna 530 is not in contact with a human body but in proximity within a predetermined distance. A change in capacitance may occur even in the case that an object having permittivity is in proximity within a predetermined distance, as opposed to being in contact, the grip sensor may determine the proximity of a human body. The condition may correspond to a condition used in a test, as opposed to a condition used when the electronic device 500 is actually used.

During an experimentation process, primarily, a distance (e.g., 7 mm) that satisfies the SAR standard may be identified under the condition of the maximum output of the antenna 530. To enable the grip sensor to sense a human body in the corresponding distance, a sensing parameter of the grip sensor may be tuned. Here, the sensing parameter may be a reference value corresponding to a capacitance value, and may include various control values used in a processor or an integrated circuit (IC) of the grip sensor. The experimentation under the human proximity condition measures a distance that satisfies the SAR standard, that is, a distance in which a human body is affected, when the antenna 530 operates based on the maximum output, and tunes a sensing parameter to be appropriate for the measured distance, and may enable the grip sensor to sense proximity of a human body in the measured distance.

FIG. 6 is a table listing a Cap difference value measured for each object by an electronic device according to certain embodiments.

As illustrated in FIG. 5, according to the SAR regulation, a grip sensor (e.g., the grip sensor 340 of FIG. 3) of an electronic device (e.g., the electronic device 300 of FIG. 3) may recognize a human body even when the human body is in proximity (e.g., a human body approaches within a predetermined distance) before being in contact, and accordingly, may configure a sensing parameter value of the grip sensor. In this instance, in case that the electronic device is placed on a table having a low permittivity than that of a human body, grip may be recognized.

FIG. 6 illustrates sensing values of a grip sensor measured when the grip sensor is in contact with or in proximity to various objects. The measured value (difference) may be digital data corresponding to (or proportional to) capacitance, and may indicate a difference from an initial value.

Referring to FIG. 6, in case that a human body (e.g., the knee) of a user approaches within a spacing distance (e.g., 7 mm) that satisfies the SAR standard, the sensing value may be 890.3. In case that a human body approaches closer than the spacing distance from the grip sensor, a sensing value may be increased higher. Accordingly, a reference value that triggers a backoff operation with respect to an antenna may be configured based on the sensing value (890.3) measured when a human body is located in the spacing distance. According to an embodiment, the electronic device may configure a sensing reference value to be a value lower than 890.3 so that the electronic device may recognize that a human body is in contact or in proximity when a sensing value of the grip sensor is higher than the sensing reference value, and may recognize that a human body is not in proximity when a sensing value is less than or equal to the sensing reference value.

According to certain embodiments, a sensing value measured when the electronic device is placed on a table, that is, when the grip sensor is in contact with an object different from a human body, may be higher than the reference value configured based on a spacing distance of 7 mm. Referring to FIG. 6, a sensing value of the grip sensor measured when the electronic device is placed on a metallic table, a rubber mat, a glass table, an acrylic table, and a wood table may be in a range of 898.2 to 1950.8, and may be higher than the reference value (a value lower than 890.3).

As described above, in the state in which the electronic device is placed on a table, the grip sensor may recognize this as a human body being in contact or in proximity, and the electronic device may perform a backoff operation. In this instance, although a human body is not actually in contact with an antenna, the output power of the antenna may be configured as a low value and thus, optimal communication performance may not be provided.

Figure 7:
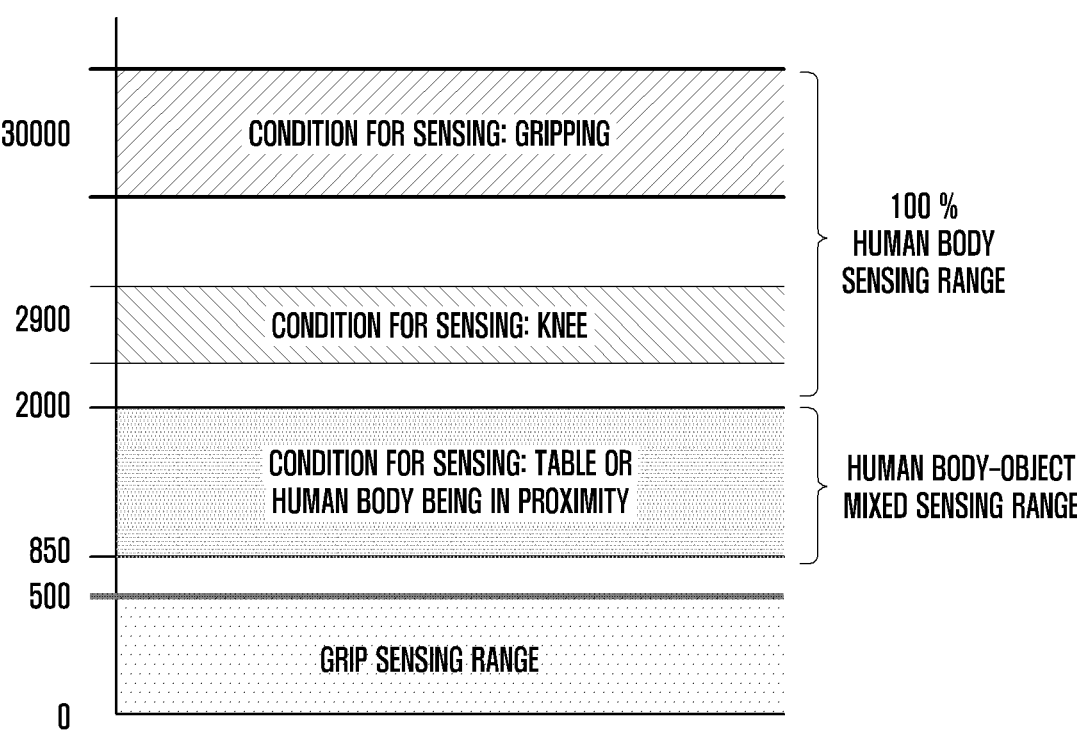
FIG. 7 is a diagram illustrating a Cap difference value and a reference value according to certain embodiments.

FIG. 7 is a diagram illustrating a sensing value of a grip sensor and a reference value according to certain embodiments.

According to certain embodiments, an electronic device (e.g., the electronic device 300 of FIG. 3) may compare a sensing value of the grip sensor (e.g., the grip sensor 340 of FIG. 3) with various reference values, and may determine the type of adjacent object (e.g., a human body or other objects such as a table and the like) based on a comparison result. According to an embodiment, to prevent deviation from the SAR standard, each reference value may be configured as a lower value than a value measured in the actual experimental data.

Referring to FIG. 6, in case that the grip sensor of the electronic device is in contact with an external object, the minimum value of a sensing value (or Cap difference) sensed by the grip sensor may be 898.2 corresponding to the case of a wood table. Based on the above-described experimental data, a value lower than a sensing value that may be sensed when an external object is in contact may be configured as a first reference value. Hereinafter, descriptions are provided by using a sensing value of 500 obtained by the grip sensor as the first reference value.

Referring to FIG. 7, a range in which the sensing value of the grip sensor is less than or equal to the first reference value of 500 may be determined as a sensing-unavailable range in which the grip sensor does not sense an external object.

Referring to FIG. 6, in case that a user grips a main body housing of an electronic device and a hand is directly in contact with an antenna, a sensing value may be 31201.5, and in case that the electronic device is placed on the knee of a user, a sensing value may be 2906.3. As described above, in case that the electronic device is in contact with a human body, a backoff operation with respect to the antenna is required, and thus this may be determined as a human body sensing range. According to certain embodiment, a value lower than a sensing value sensed when a human body is in contact may be configured as a second reference value.

Hereinafter, a description is provided by using a second reference value of 2500 that is lower than the sensing value of 2906.3 corresponding to the case in which the electronic device is placed on the knee of a user.

Referring to FIG. 7, a range between 500 and 2000 that is a part of a range of the first reference value (e.g., 500) to the second range value (e.g., 2500) may be defined as a human body-object mixed sensing range in which both a human body or an external object (e.g., a table) may be sensed. For example, a sensing value (e.g., 890.3) measured when an antenna is spaced a predetermined distance (e.g., 7 mm) apart from the knee of a user, which requires an antenna backoff operation, may fall within a human body-object mixed sensing range, and a sensing value (e.g., 898.2 to 1950.8) measured when the electronic device is placed on a table, which does not require an antenna backoff operation, may also fall within the human body-object mixed sensing range.

As described above, in case that a sensing value of the grip sensor falls within the human body-object mixed sensing range, it is difficult to determine the case as one of a human body being in proximity or an external object being in contact (or proximity). Accordingly, an electronic device according to certain embodiments may determine any one of a human body being in proximity or an external object being in contact (or proximity) via an algorithm using a plurality of reference values.

Figure 8:
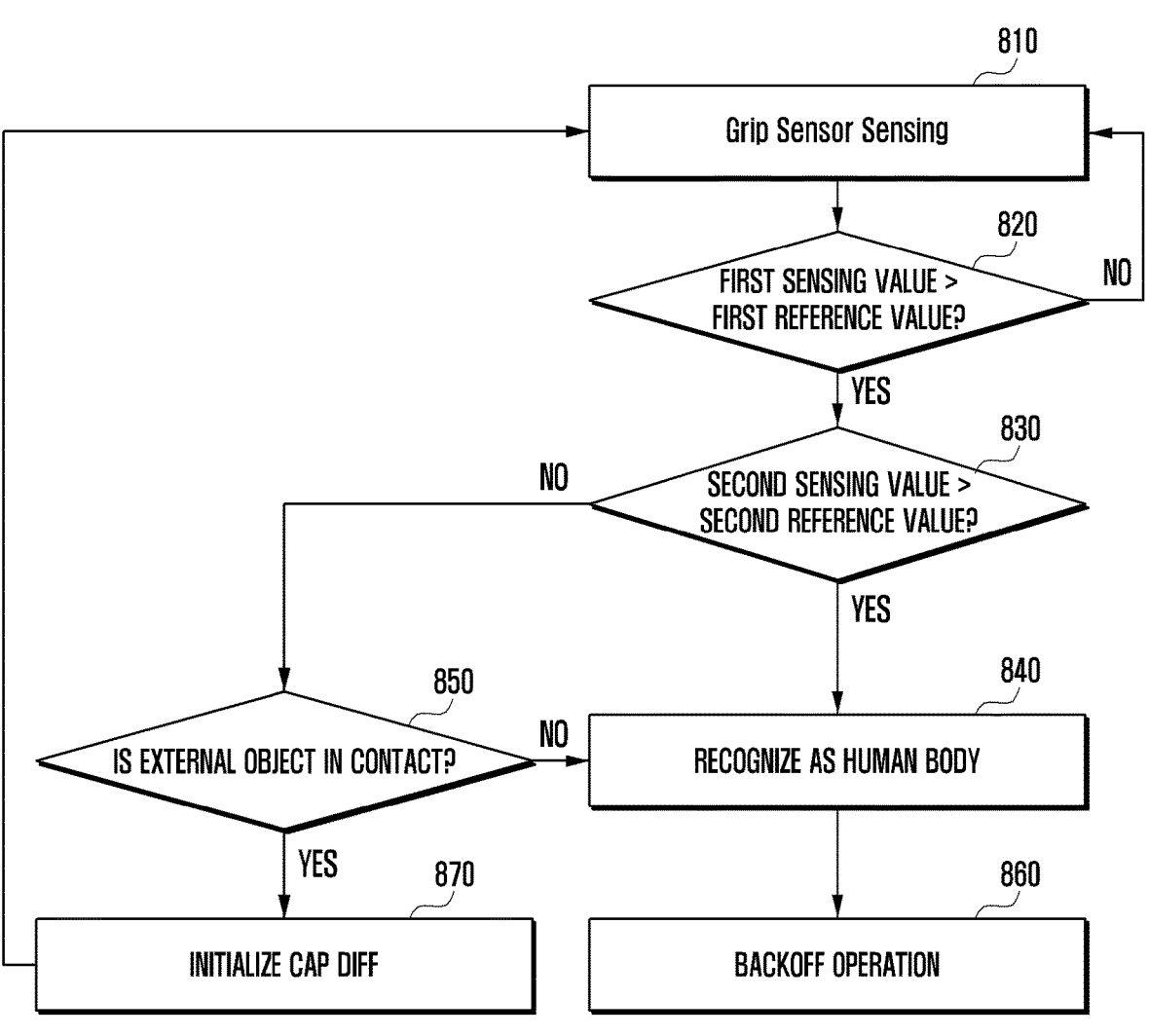
FIG. 8 is a flowchart illustrating an antenna output control method of an electronic device according to certain embodiments.

FIG. 8 is a flowchart illustrating an antenna output control method of an electronic device according to certain embodiments.

When the first sensing value of the grip sensor is less than a first reference value at 820, the power of the antenna is maintained. When the first sensing value exceeds the first reference value at 820, and a second sensing value exceeds the second reference value at 830, the electronic device is recognized as in contact with a human body at 840 and a backoff operation is performed at 860.

If the first sensing value exceeds the first reference value at 820, and the second sensing value is not more than the second reference value at 830, whether the backoff operation of 860 is performed is based a determination whether an object other than the human body is in contact with the electronic device. If the outcome of 850 is NO, the object is recognized as a human body at 840, and the backoff operation is performed. If the outcome of 850 is YES, the backoff operation is not performed.

The operations illustrated in the drawing may be performed by an electronic device (e.g., the electronic device 300 of FIG. 3), and the descriptions of the technical features which have been described above will be omitted.

According to certain embodiments, in operation 810, the electronic device (e.g., the processor 310 of FIG. 3) may identify a sensing value of a grip sensor. According to an embodiment, the grip sensor may sense a capacitance value (or a change in a capacitance value) in real time or periodically, or may sense a capacitance value when a wireless signal is output via an antenna. A sensing value of the grip sensor may be digital data that corresponds to (or is proportional to) the difference between a capacitance value measured by the electronic device in the state in which an adjacent object is not present and the currently measured capacitance value.

According to certain embodiments, in operation 820, the electronic device may identify whether the identified sensing value of the grip sensor is increased higher than a configured first reference value (threshold). Here, the reference value may be a value determined based on an experimentation result according to the SAR standard, and may be determined for each electronic device model or may be determined based on an SAR experimentation result during a manufacturing process of each electronic device. The first reference value may be a value lower than a sensing value sensed by the grip sensor in the state in which the antenna of the electronic device is spaced a predetermined distance (e.g., 7 mm) apart and a sensing value sensed in the state in which the antenna of the electronic device is in contact with an external object (e.g., a table). Alternatively, the first reference value may be a value lower than the lowest value of the human body-object mixed sensing range that has been described with reference to FIG. 7. For example, referring to FIG. 5, the first reference value may be determined to be a sensing value of 500 that is lower than a sensing value of 890.3 obtained when the electronic device is spaced 7 mm apart from a human body and a sensing value ranging from 898.2 to 1950.8 obtained when the electronic device is in contact with a table. In case that the sensing value of the grip sensor exceeds the first reference value, an operation of sensing a human body may be triggered.

According to certain embodiments, the electronic device may continuously identify a sensing value of the grip sensor even in the case that the sensing value of the grip sensor exceeds the first reference value, and may identity whether the sensing value of the grip sensor is increased higher than a second reference value in operation 830. Here, the second reference value may be a value greater than the first reference value. For example, the reference value may be a value lower than a sensing value measured when the antenna of the electronic device is in contact with a human body. Alternatively, the second reference value may be a value higher than the highest value of the human body-object mixed sensing range that has been described with reference to FIG. 7. For example, referring to FIG. 5, the second reference value may be determined to be 2500 that is lower than a sensing value of 2906.3 obtained when the electronic device is in contact with a human body.

According to certain embodiments, in case that the sensing value of the grip sensor is increased higher than the second reference value, the electronic device may determine that the electronic device is in contact with a human body in operation 840. In this instance, in operation 860, the electronic device may perform a backoff operation with respect to the antenna.

According to certain embodiments, in case that a sensing value of the grip sensor falls within a range between the first reference value and the second reference value, the sensing value may belong to the human body-object mixed sensing range. For example, a sensing value (e.g., 890.3) measured when the antenna is spaced a predetermined distance (e.g., 7 mm) apart from the knee of a user, which requires an antenna backoff operation, may fall within the human body-object mixed sensing range, and a sensing value (e.g., 898.2 to 1950.8) measured when an electronic device is placed on a table, which does not require an antenna backoff operation, may also fall within the human body-object mixed sensing range.

According to certain embodiments, in case that the sensing value of the grip sensor is less than or equal to the second reference value, the electronic device may identify whether an object different from a human body is in contact with the antenna in operation 850. According to certain embodiments, in case that a user input is provided to an input device such as a keyboard and/or a touch pad prepared in the electronic device, the electronic device may determine that the electronic device is in a state of use.

In case that a result of the identification shows that the electronic device is in proximity, the electronic device may determine that the electronic device is in contact with a human body in operation 840. In this instance, in operation 860, the electronic device may perform a backoff operation with respect to the antenna.

According to certain embodiments, in case that the sensing value of the grip sensor is less than or equal to the second reference value and the electronic device is in contact with an external object, the electronic device may initialize a capacitance difference value in operation 870. Accordingly, a sensing value measured thereafter may be determined as a change in the initialized capacitance value.

In case that the electronic device is in the state of floating in the air, it means that a user holds the electronic device with a hand. In case that the user holds, with a hand, the area of an antenna disposed in a lateral side of the electronic device, a sensing value of the grip sensor may be higher than the second reference value, and thus the electronic device may recognize that a human body is in contact and may perform an antenna backoff operation. Conversely, in case that the user holds, with a hand, an area besides the antenna, a sensing value of the grip sensor may be lower than the first reference value, and thus the electronic device may maintain the maximum output of the antenna since a human body is not affected.

In case that a sensing value of the grip sensor is greater than the first reference value and less than or equal to the second reference value, that is, in case that the sensing value falls within the human body-object mixed sensing range, it is determined that the electronic device is placed on a place, as opposed to floating in the air. Accordingly, in case that a user input is provided to an input device such as a keyboard and/or a touch pad in the state in which the sensing value of the grip sensor is greater than the first reference value and less than or equal to the second reference value, the electronic device may recognize that the electronic device is placed on a table and may maintain the maximum output of the antenna.

Figure 9:
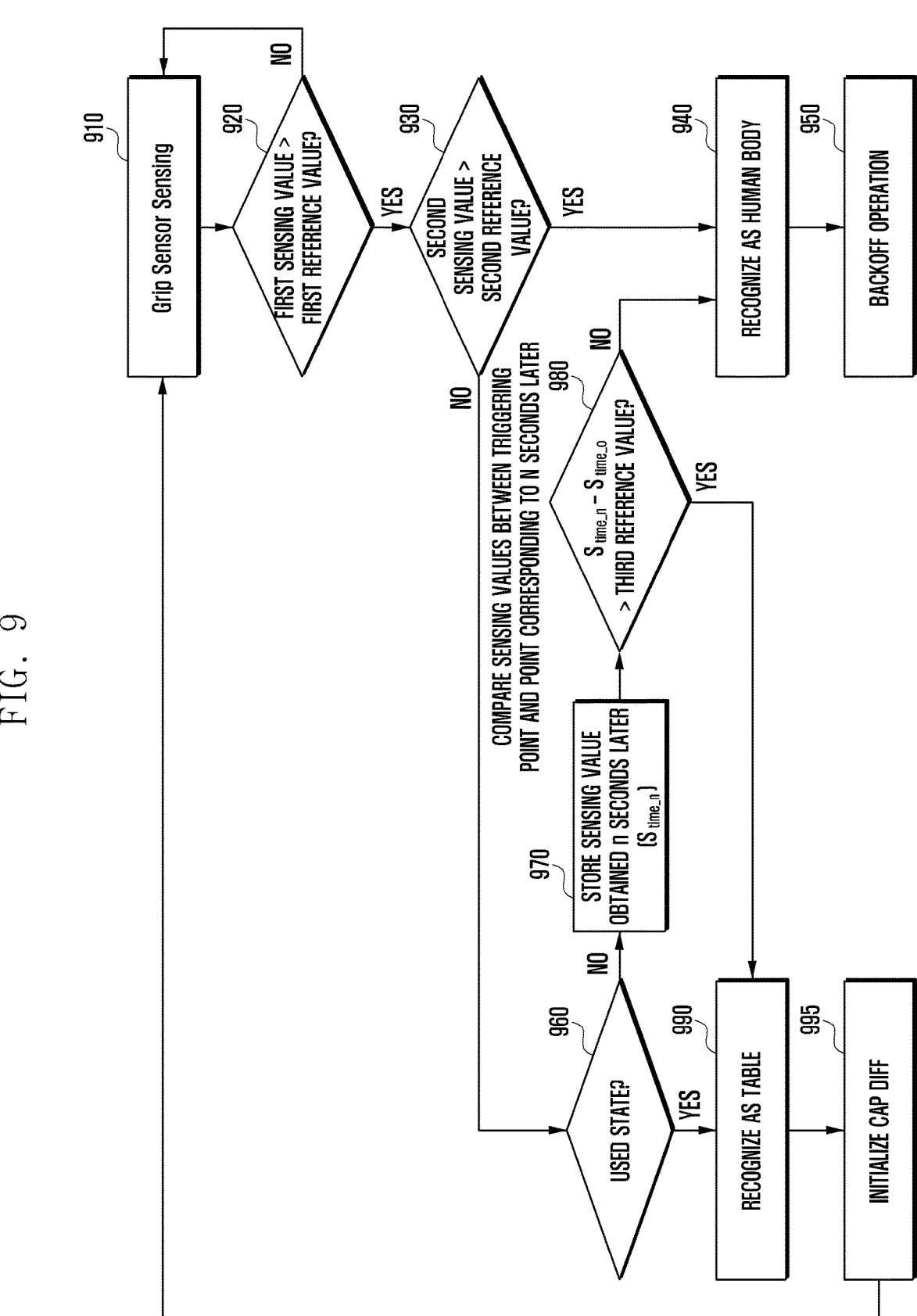
FIG. 9 is a flowchart illustrating an antenna output control method of an electronic device according to certain embodiments.

FIG. 9 is a flowchart illustrating an antenna output control method of an electronic device according to certain embodiments.

When the first sensing value of the grip sensor is less than a first reference value at 920, the power of the antenna is maintained. When the first sensing value exceeds the first reference value at 920, and a second sensing value exceeds the second reference value at 930, the electronic device is recognized as in contact with a human body at 940 and a backoff operation is performed at 950.

If the first sensing value exceeds the first reference value at 920, and the second sensing value is not more than the second reference value at 930, whether the backoff operation of 950 is based on whether the electronic device is in a state of use during 960, and sensed values, and a third reference value.

The operations illustrated in the drawing may be performed by an electronic device (e.g., the electronic device of FIG. 3), and the descriptions of the technical features which have been described above will be omitted.

According to certain embodiments, in operation 910, the electronic device (e.g., the processor of FIG. 3) may identify a sensing value of a grip sensor.

According to certain embodiments, in operation 920, the electronic device may identify whether the identified sensing value of the grip sensor is increased higher than a configured first reference value (threshold). Here, the reference value may be a value determined based on an experimentation result according to the SAR standard, and may be determined for each electronic device model or may be determined based on an SAR experimentation result during a manufacturing process of each electronic device. In case that the sensing value of the grip sensor exceeds the first reference value, an operation of sensing a human body may be triggered. The electronic device may record an initial sensing value of the grip sensor identified when a human body sensing operation is triggered, and the recorded initial sensing value $S_0$ may be a value greater than but close to the first reference value.

According to certain embodiments, the electronic device may continuously identify a sensing value of the grip sensor even in the case that the sensing value of the grip sensor exceeds the first reference value, and may identity whether the sensing value of the grip sensor is increased higher than a second reference value in operation 930. Here, the second reference value may be a value greater than the first reference value. For example, the reference value may be a value lower than a sensing value measured when the antenna of the electronic device is in contact with a human body. Alternatively, the second reference value may be a value higher than the highest value of the human body-object mixed sensing range that has been described with reference to FIG. 7.

According to certain embodiments, in case that the sensing value of the grip sensor is increased higher than the second reference value, the electronic device may determine that the electronic device determines that an antenna is in contact with or in proximity to a human body in operation 940. In this instance, in operation 950, the electronic device may perform a backoff operation with respect to the antenna.

According to certain embodiments, in case that a sensing value of the grip sensor falls within a range between the first reference value and the second reference value, the sensing value may belong to the human body-object mixed sensing range. For example, a sensing value (e.g., 890.3) measured when an antenna is spaced a predetermined distance (e.g., 7 mm) apart from the knee of a user, which requires an antenna backoff operation, may fall within the human body-object mixed sensing range, and a sensing value (e.g., 898.2 to 1950.8) measured when the electronic device is placed on a table, which does not require an antenna backoff operation (or which is capable of operating based on the maximum output), may also fall within the human body-object mixed sensing range.

According to certain embodiments, in case that the sensing value of the grip sensor is less than or equal to the second reference value, the electronic device may identify whether the electronic device is in a state of use or unused state in operation 960. According to certain embodiments, in case that a user input is provided to an input device such as a keyboard and/or a touch pad prepared in the electronic device, the electronic device may determine that the electronic device is in the state of use. For example, in case that a user input is provided via the keyboard and/or the touch pad after an operation of sensing a human body is triggered since a sensing value of the grip sensor exceeds the first reference value, the electronic device may be determined as being in the state of use.

According to certain embodiments, in case that the electronic device is in the state of use, the electronic device may determine that an external object (e.g., a table) is in contact with the antenna in operation 990. In operation 995, the electronic device may initiate a capacitance difference value.

According to certain embodiments, in case that the electronic device is not in a state of use, the electronic device may identify a sensing value ($S_n$) of the grip sensor after a predetermined n seconds (e.g., 10 seconds) elapses, in operation 970.

According to certain embodiments, the predetermined n seconds (e.g., 10 seconds) may include a time configured in a program (e.g., the program 140 of FIG. 1) and/or a memory via experimentation, or a time configured by analyzing a sensing value ($S_n$) of the grip sensor over time by using a program (e.g., the program 140 of FIG. 1) stored in the electronic device.

According to certain embodiments, in operation 980, the electronic device may obtain the difference between the sensing value ($S_n$) obtained n seconds later and the recorded initial sensing value ($S_0$), and may identify whether the calculated difference is higher than a third reference value. The third reference value may be a value greater than the first reference value and less than the second reference value.

According to certain embodiments, the difference between the sensing value ($S_n$) obtained n seconds later and the recorded initial sensing value ($S_0$) is higher than the third reference value, the electronic device may determine that that the antenna is in proximity to or contact with a human body in operation 940. In this instance, in operation 950, the electronic device may perform a backoff operation with respect to an antenna.

According to certain embodiments, the difference between the sensing value ($S_n$) sensed n seconds later and the recorded initial sensing value ($S_0$) is less than or equal to the third reference value, the electronic device may determine that that the antenna is in contact with an external object (e.g., a table) in operation 990. Accordingly, via comparing the difference between the sensing value (Sn) obtained n seconds after sensing the initial sensing value ($S_0$) and the recorded initial sensing value (S0) with the third reference value, the electronic device may identify whether an object that is in contact with or proximity to the antenna is a human body or an object other than the human body even in the unused state in which a user input is not provided to an input device.

In operation 995, the electronic device may initiate a capacitance difference value.

FIG. 10 is a table listing the output power measured for each frequency band by an electronic device according to certain embodiments.

According to certain embodiments, the electronic device (e.g., the electronic device 300 of FIG. 3) may support cellular wireless communication, for example, LTE and/or 5G NR wireless communication. FIG. 10 is a table listing a total radiated power measured when an antenna backoff operation is controlled using each of a comparative technique and the disclosure in the LTE and 5G NR wireless communication.

Referring to FIG. 10, the total radiated power of the disclosure is measured approximately 4.8 to 5.3 dB higher than the comparative technique in B1, B3, B7, B8, B20, B28, B38, and B40 that are LTE bands, and also, is measured approximately 4.6 to 5.4 dB higher than the comparative technique in n1, n3, n8, n20, n28, n38, and n78 that are 5G NR bands.

The comparative technique may determine that a human body is in proximity in a human body-object mixed sensing range of a sensing value of a grip sensor, and may perform an antenna backoff operation. However, according to certain embodiments of the disclosure, unlike the comparative technique, a human body being in proximity and an object other than a human body being in contact (or proximity) may be distinguished in a human body-object mixed sensing range of a sensing value of a grip sensor, and thus the frequency of performing antenna backoff is decreased and a relatively high antenna output efficiency may be provided.

An electronic device according to certain embodiments may include a housing, an antenna disposed in the housing or formed in a part of the housing, a grip sensor configured to sense an external object that is in contact or proximity, and a processor operatively connected to the antenna and the grip sensor, wherein the processor may be configured to, when a first sensing value from the grip sensor is less than or equal to a first reference value, determine an output power of the antenna to be a first intensity; when a second sensing value from the grip sensor received after the first sensing value is between the first reference value and a second reference value higher than the first sensing value, determine whether the electronic device is in a state of use, and when the electronic device is not in the state of use, determine, based on a third reference value and a third sensing value of the grip sensor received after the second sensing value, the output power of the antenna to be the first intensity or a second intensity lower than the first intensity.

According to certain embodiments, when the second sensing value is greater than the second reference value, the processor may be configured to determine that a human body is in contact with or proximity to the antenna.

According to certain embodiments, the electronic device may further include at least one of a keyboard or a touch pad, and the processor may be configured to determine that the electronic device is in the state of use when a user input is provided to at least one of the keyboard or the touch pad.

According to certain embodiments, in case that the electronic device is in the state of use, the processor may be configured to maintain the determined first intensity to be the output power of the antenna.

According to certain embodiments, the processor may be configured to compare a difference between the third sensing value and the first sensing value with the third reference value.

According to certain embodiments, when the difference between the third sensing value and the first sensing value is greater than the third reference value, determine that a human body is in contact with or in proximity to the antenna, and determine that an external object is in contact with or in proximity to the antenna when the difference is less than or equal to the third reference value.

According to certain embodiments, the first reference value is a value lower than a sensing value measured in a state when the antenna is spaced at a predetermined distance apart from a human body, and the second reference value is a value lower than a sensing value measured in a state when the antenna is in contact with a human body.

According to certain embodiments, the housing may include a first housing including a display and a second housing including at least one of a keyboard or a touch pad, and is rotatably coupled with the first housing, and the antenna is disposed in at least a part of a lateral side of the second housing.

According to certain embodiments, the processor adjusts a gain of a power amplifier to output power from the antenna at the first intensity and the second intensity.

According to certain embodiments, the electronic device comprises a laptop personal computer (PC).

According to certain embodiments, the antenna may be configured to output a signal of cellular radio communication including at least one of long term evolution (LTE) or 5G new radio (NR).

A method of controlling the output power of an antenna of an electronic device according to certain embodiments may include when a first sensing value from a grip sensor is less than or equal to a first reference value, output power from the antenna of the electronic device at a first intensity; when the first sensing value exceeds the first reference value and a second sensing value from the grip sensor received after the first sensing value is between the first reference value and a second reference value higher than the first sensing value, determine whether the electronic device is in a state of use; and when the electronic device is not in a state of use, determine, based on a third reference value and a third sensing value of the grip sensor received after the second sensing value, the output power of the antenna to be the first intensity or a second intensity that is lower than the first intensity.

According to certain embodiments, when the second sensing value is greater than the second reference value, determining that a human body is in contact with or in proximity to the antenna.

According to certain embodiments, the operation of determining whether the electronic device is in the state of use or not in the state of use may include an operation of determining that the electronic device is in the state of use in case that a user input is provided to at least one of a keyboard or a touch pad of the electronic device.

According to certain embodiments, the method may further include an operation of maintaining of the first intensity as the output power of the antenna when the electronic device is in the state of use.

According to certain embodiments, the operation of determining the output power of the antenna to be the first intensity or the second intensity based on the third sensing value and the third reference value may include an operation of comparing a difference between the third sensing value and the first sensing value with the third reference value.

According to certain embodiments, the operation of determining the output power of the antenna to be the first intensity or the second intensity based on the third sensing value and the third reference value may include an operation of determining that a human body is in contact with or in proximity to the antenna in case that the difference between the third sensing value and the first sensing value is greater than the third reference value, or an operation of determining that an external object is in contact with or in proximity to the antenna in case that the difference is less than or equal to the third reference value.

According to certain embodiments, the first reference value may be a value lower than a sensing value measured in a state when the antenna is spaced a predetermined distance from a human body, the second reference value may be a value lower than a sensing value measured when the antenna is in contact with a human body.

According to certain embodiments, the electronic device may include a first housing including a display and a second housing including at least one of a keyboard or a touchpad and rotatably coupled with the first housing, and the antenna may be disposed in at least a part of a lateral side of the second housing.

According to certain embodiments, the method may further include an operation of adjusting gain of a power amplifier in order to decrease the output power of the antenna to the second intensity.

Although certain embodiments have been presented with a degree of particularity, it shall be understood that the foregoing embodiments are not limiting, and various modifications, and substitutions, omissions of parts, and additions may be made without departing from the sprit and scope of this disclosure.

What is claimed is:

1. An electronic device comprising:
a housing;
an antenna disposed in the housing or formed in a part of the housing;
a grip sensor configured to sense an external object that is in contact with or proximity to the electronic device; and
a processor operatively connected to the antenna and the grip sensor,
wherein the processor is configured to:
    when a first sensing value from the grip sensor is less than or equal to a first reference value, set a power level of a signal output via the antenna as a first power level;
    when a second sensing value from the grip sensor received after the first sensing value is between the first reference value and a second reference value higher than the first reference value, determine whether the electronic device is in a state of use based on whether a user input is received; and
    when the electronic device is not in the state of use, determine whether a difference between the first sensing value and a third sensing value of the grip sensor received after the second sensing value is greater than a third reference value;
    when the difference is less than or equal to the third reference value, maintain the power level of the signal output via the antenna as the first power level; and
    when the difference is greater than the third reference value, set the power level of the signal output via the antenna as a second power level lower than the first power level.

2. The electronic device of claim 1, wherein when the second sensing value is greater than the second reference value, the processor is configured to set the power level of the signal output via the antenna as the second power level.

3. The electronic device of claim 1, further comprising at least one of a keyboard or a touch pad, wherein the processor is configured to determine that the electronic device is in the state of use when a user input is received via at least one of the keyboard or the touch pad.

4. The electronic device of claim 1, wherein, in case that the electronic device is in the state of use, the processor is configured to maintain the power level of the signal output via the antenna as the first power level.

5. The electronic device of claim 1, wherein the first reference value is a value lower than a sensing value measured in a state when the antenna is spaced at a predetermined distance apart from a human body,
wherein the second reference value is a value lower than a sensing value measured in a state when the antenna is in contact with a human body.

6. The electronic device of claim 1, wherein the housing comprises:
a first housing including a display; and
a second housing including at least one of a keyboard or a touch pad, and is rotatably coupled with the first housing,
wherein the antenna is disposed in at least a part of a lateral side of the second housing.

7. The electronic device of claim 1, wherein the processor adjusts a gain of a power amplifier to output the signal via the antenna having the first power level or the second power level.

8. The electronic device of claim 1, wherein the electronic device comprises a laptop personal computer (PC).

9. The electronic device of claim 1, wherein the antenna is configured to output a signal of cellular radio communication including at least one of long-term evolution (LTE) or 5G new radio (NR).

10. A method of setting a power level of a signal output via an antenna of an electronic device, the method comprising:

when a first sensing value from a grip sensor is less than or equal to a first reference value, setting the power level of the signal output via the antenna as a first power level;

when a second sensing value from the grip sensor received after the first sensing value is between the first reference value and a second reference value higher than the first reference value, determine whether the electronic device is in a state of use based on whether a user input is received; and when the electronic device is not in a state of use, determine, whether a difference between the first sensing value and a third sensing value of the grip sensor received after the second sensing value is greater than a third reference value, when the difference is less than or equal to the third reference value, maintaining the power level of the signal output via the antenna as the first power level, and when the difference is greater than the third reference value, setting the power level of the signal output via the antenna as a second power level lower than the first power level.

11. The method of claim 10, further comprising, when the second sensing value is greater than the second reference value, setting the power level of the signal output via the antenna as the second power level.

12. The method of claim 10, wherein determining whether the electronic device is the state of use or not in the state of use comprises determining that the electronic device is in state of use when a user input is received via at least one of a keyboard or a touch pad of the electronic device.

13. The method of claim 10, further comprising maintaining the power level of the signal output via the antenna as the first power level, when the electronic device is in the state of use.

14. The method of claim 10, wherein the first reference value is a value lower than a sensing value measured in a state when the antenna is spaced at a predetermined distance from a human body, and wherein the second reference value is a value lower than a sensing value measured in a state when the antenna is in contact with a human body.

15. The method of claim 10, wherein the electronic device comprises:

a first housing including a display; and a second housing including at least one of a keyboard or a touch pad, and rotatably coupled with the first housing, and wherein the antenna is disposed in at least a part of a lateral side of the second housing.

16. The method of claim 10, further comprising adjusting gain of a power amplifier in order to output the signal via the antenna having the first power level or the second power level.

* * * * *